United States Patent
Petri

(10) Patent No.: US 8,108,373 B2
(45) Date of Patent: Jan. 31, 2012

(54) SELECTING AN AUTHOR OF MISSING CONTENT IN A CONTENT MANAGEMENT SYSTEM

(75) Inventor: John Edward Petri, Lewiston, MN (US)

(73) Assignee: International Business Machines Corporation, Armonk, NY (US)

( * ) Notice: Subject to any disclaimer, the term of this patent is extended or adjusted under 35 U.S.C. 154(b) by 1189 days.

(21) Appl. No.: 11/847,029

(22) Filed: Aug. 29, 2007

(65) Prior Publication Data

US 2009/0063450 A1    Mar. 5, 2009

(51) Int. Cl.
*G06F 17/30*    (2006.01)

(52) U.S. Cl. ........ 707/705; 707/713; 707/723; 707/748; 707/769

(58) Field of Classification Search ........... 707/999.001, 707/999.005, 999.104, 705, 713, 723, 748, 707/769
See application file for complete search history.

(56) References Cited

U.S. PATENT DOCUMENTS

| | | | |
|---|---|---|---|
| 6,560,589 B1 * | 5/2003 | Stier et al. .................. 707/999.2 |
| 6,591,258 B1 * | 7/2003 | Stier et al. .............. 707/999.004 |
| 6,810,383 B1 * | 10/2004 | Loveland ...................... 705/7.13 |
| 7,409,360 B1 * | 8/2008 | Lark et al. ..................... 705/26.3 |
| 7,761,443 B2 * | 7/2010 | Bhaghavan et al. .......... 707/713 |
| 7,797,335 B2 * | 9/2010 | Stern et al. .................... 707/713 |
| 2003/0061305 A1 * | 3/2003 | Copley et al. ................. 709/217 |
| 2004/0199867 A1 * | 10/2004 | Brandenborg ............. 707/104.1 |
| 2005/0132207 A1 * | 6/2005 | Mourad ........................ 713/189 |
| 2005/0283675 A1 * | 12/2005 | Krebs ............................ 714/38 |
| 2006/0004914 A1 * | 1/2006 | Kelly et al. ................... 709/219 |
| 2006/0080321 A1 * | 4/2006 | Horn et al. ...................... 707/10 |
| 2006/0129538 A1 * | 6/2006 | Baader et al. .................... 707/3 |
| 2007/0033213 A1 * | 2/2007 | Bezrukov et al. ............. 707/102 |
| 2007/0288518 A1 * | 12/2007 | Crigler et al. .............. 707/104.1 |
| 2008/0016098 A1 * | 1/2008 | Frieden et al. ................ 707/102 |
| 2008/0228719 A1 * | 9/2008 | Abhyanker et al. ............... 707/3 |
| 2009/0157490 A1 * | 6/2009 | Lawyer ............................ 707/5 |
| 2009/0157667 A1 * | 6/2009 | Brougher et al. ................. 707/5 |
| 2009/0204469 A1 * | 8/2009 | Markram ................... 707/104.1 |
| 2009/0259661 A1 * | 10/2009 | Cragun et al. .................... 707/9 |
| 2009/0259662 A1 * | 10/2009 | Cragun et al. .................... 707/9 |
| 2010/0287291 A1 * | 11/2010 | Blakley et al. ................ 709/229 |

OTHER PUBLICATIONS

"Knowledge Management", pp. 1-8, printed Aug. 29, 2007 at http://en.wikipedia.org/wiki/Knowledge_management.
"Skills Management", pp. 1-2, printed Aug. 29, 2007 at http://en.wikipedia.org/wiki/Skills_management.
"Darwin Information Typing Architecture", pp. 1-3. printed Aug. 29, 2007 at http://en.wikipedia.org/wiki/DITA.
"DITA Specification draft", p. 1, printed Aug. 29, 2007 at http://docs.oasis-open.org/dita/v1.0/archspec/ditaspec.toc.html.

* cited by examiner

*Primary Examiner* — Charles Rones
*Assistant Examiner* — Rezwanul Mahmood
(74) *Attorney, Agent, or Firm* — Martin & Associates LLC; Derek P. Martin

(57) ABSTRACT

A content management system (CMS) includes metadata for each element in the repository. When an element has missing content that needs to be created, the repository is queried to identify elements which most closely match the metadata of the missing content. The metadata for these identified elements is analyzed to determine the authors for these elements which most closely match the element that needs to be authored. The authors are then ranked according to an author selection policy that may specify any suitable criteria for ranking authors, including author selection criteria, author ranking criteria, author filtering criteria, and author backup criteria. The result is a ranked list of one or more authors that are deemed the best choices of authors to author the missing content. The user may then request one of the authors in the ranked list to create the missing content.

13 Claims, 7 Drawing Sheets

```
object_id: 0
<Document type="user-guide" os="Windows95">
(information omitted for sake of brevity)
</Document>
```
— 700

```
object_id: 1
<Document type="user-guide" os="Windows 98">
(information omitted for sake of brevity)
</Document>
```
— 800

```
object_id: 2
<Document type="user-guide" os="Windows NT">
    <xi:include href="cms://obj_id:6"/>              — 910
    (additional information omitted for sake of brevity)
</Document>
```

FIG. 9

```
object_id: 3
<Document type="help" os="Windows XP">
    <xi:include href="cms://obj_id:5"/>              — 1010
    (additional information omitted for sake of brevity)
</Document>
```

FIG. 10

```
object_id: 4, author="Joe"
<Article type="tutorial" name="Remote Desktop"
description="Describes how to configure Windows Remote
Desktop">
(information omitted for sake of brevity)
</Article>
```

FIG. 11

```
object_id: 5, author="Nancy"
<Article type="reference" name="Netmeeting Properties"
description="Netmeeting reference guide">
(information omitted for sake of brevity)
</Article>
```

FIG. 12

```
object_id: 6, author="Suzy"
<Article type="tutorial" name="Basic Networking Instructions"
description="Tutorial explaining how to configure networking in
Windows. Includes information for setting up Netmeeting.">
(information omitted for sake of brevity)
</Article>
```

FIG. 13

```
object_id: 7, author="Joe"
 <Article type="help" name="Troubleshooting Netmeeting"
description="Netmeeting troubleshooting guide">
(information omitted for sake of brevity)
</Article>
```
⟵ 1400

FIG. 14

```
<Document type="user-guide" os="Windows XP">
    <Article type="tutorial" name="Netmeeting"
    description="This is a tutorial for using Netmeeting">    ⟵ 1510
        need information for this element
    </Article>
    <Article type="tutorial" name="Internet Explorer"
    description="This is a tutorial for using Internet Explorer">    ⟵ 1520
        need information for this element
    </Article>
</Document>
```
1500

FIG. 15 select articles where type equals "tutorial"
or name contains "Netmeeting"    ⟵ 1600
or description contains "Netmeeting"

| Object ID | Rank |
|-----------|------|
| 6 | 1 |
| 5 | 2 |
| 7 | 3 |
| 4 | 4 |

FIG. 17

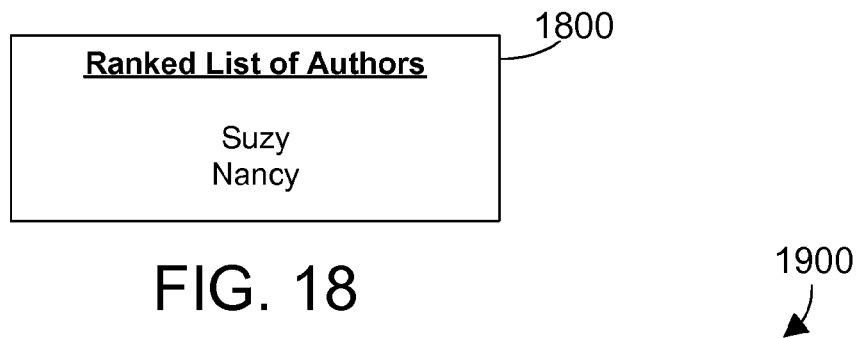

FIG. 18

| Author | Documents in Progress | Workload Time (days) |
|---|---|---|
| Joe | 1 | 5 |
| Nancy | 3 | 15 |
| Suzy | 4 | 15 |

FIG. 19

```
<Condition operator="OR">
   <Condition operator="AND">
     <Condition name="in_progress_docs" operator="LE">
       <Value val="3"/>
     </Condition>
     <Condition name="workload_time" operator="LT">
       <Value val="20"/>
     </Condition>
   </Condition>
   <Condition name="request_priority" operator="GE">
     <Value val="high"/>
   </Condition>
</Condition>
```

FIG. 20

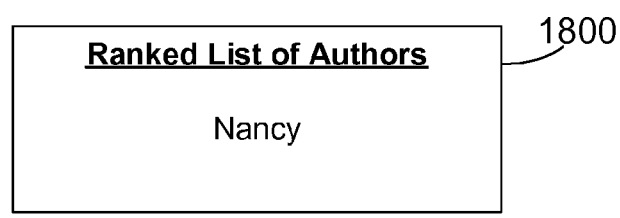

FIG. 21

SELECTING AN AUTHOR OF MISSING CONTENT IN A CONTENT MANAGEMENT SYSTEM

BACKGROUND

1. Technical Field

This disclosure generally relates to content management systems, and more specifically relates to authoring content in a content management system.

2. Background Art

A content management system (CMS) allows many users to efficiently share electronic content such as text, audio files, video files, pictures, graphics, etc. Content management systems typically control access to content in a repository. A user may generate content, and when the content is checked into the repository, the content may be subsequently processed by the CMS according to predefined rules. A user may also check out content from the repository, or link to content in the repository while generating content. The rules in a CMS assure that content that comes into or out of the system or that is linked to meets desired criteria specified in the rules.

Often a user known as a document assembler works with a "skeleton", "map" or "template" that outlines the various elements needed to fill the desired document. The document assembler can search the repository for elements that match specific criteria, and can insert those elements into the document where needed. However, if there is a needed element that is missing (i.e., does not exist in the repository), the element must be created by a qualified author. Currently, the author for a particular element must be manually chosen. This is a difficult decision, as the person responsible for choosing an author may not necessarily know all of the skills and workloads of the different authors. For example, it would be inefficient to have an author write a UNIX procedure if that author is most familiar with Windows XP. Existing knowledge and management techniques attempt to capture knowledge and track skills in various forms across an organization. However, these techniques often require separate skill assessments (e.g. reviews with a manager) as well as a system or database for helping managers search for authors with particular skills needed for a project. Without a way to identify potential authors for missing content in a content management system, document assemblers and managers will have to continue the labor-intensive tasks of tracking the various authors and manually managing their workloads.

BRIEF SUMMARY

A content management system (CMS) includes metadata for each element in the repository. When an element has missing content that needs to be created, the repository is queried to identify elements which most closely match the metadata of the missing content. The metadata for these identified elements is analyzed to determine the authors for these elements which most closely match the element that needs to be authored. The authors are then ranked according to an author selection policy that may specify any suitable criteria for ranking authors, including author selection criteria, author ranking criteria, author filtering criteria, and author backup criteria. The result is a ranked list of one or more authors that are deemed the best choices of authors to author the missing content. The user may then request one of the authors in the ranked list to create the missing content.

The foregoing and other features and advantages will be apparent from the following more particular description, as illustrated in the accompanying drawings.

BRIEF DESCRIPTION OF THE SEVERAL VIEWS OF THE DRAWING(S)

The disclosure will be described in conjunction with the appended drawings, where like designations denote like elements, and:

Figure 1:
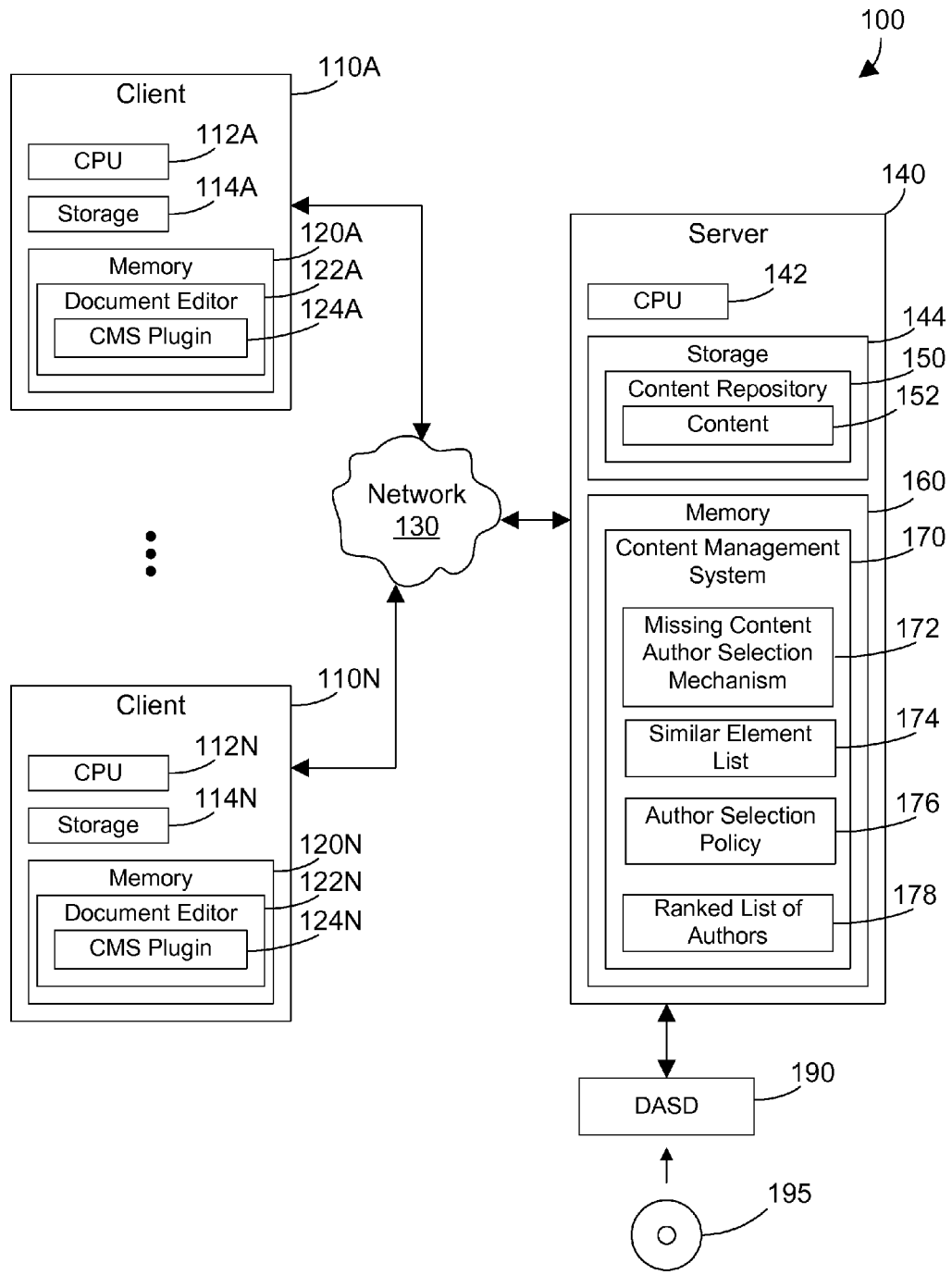
FIG. 1 is a block diagram of a networked computer system that includes a server computer system that has a content management system that includes a missing content author selection mechanism that determines one or more potential authors for a desired element.

FIGS. 7-14 each show sample XML objects in the repository;

FIG. 15 shows a sample XML template that has missing information;

FIG. 16 shows a sample query constructed by missing content author selection mechanism 172 shown in FIG. 1;

FIG. 17 shows a sample similar element list that is ranked;

FIG. 18 shows a sample ranked list of authors;

FIG. 19 shows a sample set of author pending job data;

FIG. 20 shows sample author filtering criteria; and

FIG. 21 shows the sample ranked list of authors shown in FIG. 18 after the author filtering criteria shown in FIG. 20 have been applied.

DETAILED DESCRIPTION

Many known content management systems use extensible markup language (XML) due to its flexibility and power in managing diverse and different types of content. One known content management system that uses XML is Solution for Compliance in a Regulated Environment (SCORE) developed by IBM Corporation. XML is growing in popularity, and is quickly becoming the preferred format for authoring and publishing. While the disclosure herein discusses XML documents as one possible example of content that may be managed by a content management system, the disclosure and claims herein expressly extend to content management systems that do not use XML.

The content management system disclosed herein provides built-in functions that help a user assembling a document to identify one or more potential authors for missing content in the document. When a user requests a missing element in a document, the content management system identifies elements in the repository that are similar to the requested element. The authors of the similar elements are then identified, which allows the user to select an appropriate author for the missing element.

Referring to FIG. 1, networked computer system 100 includes multiple clients, shown in FIG. 1 as clients 110A, . . . , 110N, coupled to a network 130. Each client preferably includes a CPU, storage, and memory that contains a document editor, and a content management system (CMS) plugin. Thus, client 110A includes a CPU 112A, storage 114A, memory 120A, a document editor 122A in the memory 120A that is executed by the CPU 112A, and a CMS plugin 124A that allows the document editor 122A to interact with content 152 in the repository 150 that is managed by the CMS 170 in server 140. In similar fashion, other clients have similar components shown in client 110A, through client 110N, which includes a CPU 112N, storage 114N, memory 120N, a document editor 122N, and a CMS plugin 124N.

The CMS 170 resides in the main memory 160 of a server computer system 140 that also includes a CPU 142 and storage 144 that includes a content repository 150 that holds content 152 managed by the CMS 170. As used in the disclosure and claims herein, the term "document" means any type of data that may be managed by a content management system, including all known types of data and objects as well as those developed in the future, and the term "element" means any section or portion of a document, whether actually in the document or linked to from the document. The term "missing element" and "missing content" herein refers to a defined element with some or all of its metadata fields filled with data that has some or all of its content missing.

One example of a suitable server computer system 140 is an IBM eServer System i computer system. However, those skilled in the art will appreciate that the disclosure herein applies equally to any type of client or server computer systems, regardless of whether each computer system is a complicated multi-user computing apparatus, a single user workstation, or an embedded control system. CMS 170 includes a missing content author selection mechanism 172, a similar element list 174, an author selection policy 176, and a ranked list of authors 178. Missing content author selection mechanism 172 formulates a query to content repository 150 when content is missing, and the results from the query are included in similar element list 174. Missing content author selection mechanism 172 determines the authors of elements in similar element list 174, and creates a ranked list of authors 178 from the authors of elements in similar element list 174. The selection, ranking and filtering of authors may be done according to the author selection policy 176, which specifies one or more criteria for selecting one or more authors based on the elements in the similar element list 174.

In FIG. 1, repository 150 is shown separate from content management system 170. In the alternative, repository 150 could be within the content management system 170. Regardless of the location of the repository 150, the content management system 170 controls access to content 152 in the repository 150.

Server computer system 140 may include other features of computer systems that are not shown in FIG. 1 but are well-known in the art. For example, server computer system 140 preferably includes a display interface, a network interface, and a mass storage interface to an external direct access storage device (DASD) 190. The display interface is used to directly connect one or more displays to server computer system 140. These displays, which may be non-intelligent (i.e., dumb) terminals or fully programmable workstations, are used to provide system administrators and users the ability to communicate with server computer system 140. Note, however, that while a display interface is provided to support communication with one or more displays, server computer system 140 does not necessarily require a display, because all needed interaction with users and other processes may occur via the network interface.

The network interface is used to connect the server computer system 140 to multiple other computer systems (e.g., 110A, ..., 110N) via a network, such as network 130. The network interface and network 130 broadly represent any suitable way to interconnect electronic devices, regardless of whether the network 130 comprises present-day analog and/or digital techniques or via some networking mechanism of the future. In addition, many different network protocols can be used to implement a network. These protocols are specialized computer programs that allow computers to communicate across a network. TCP/IP (Transmission Control Protocol/Internet Protocol) is an example of a suitable network protocol.

The mass storage interface is used to connect mass storage devices, such as a direct access storage device 190, to server computer system 140. One specific type of direct access storage device 190 is a readable and writable CD-RW drive, which may store data to and read data from a CD-RW 195.

Main memory 160 preferably contains data and an operating system that are not shown in FIG. 1. A suitable operating system is a multitasking operating system known in the industry as i5/OS; however, those skilled in the art will appreciate that the spirit and scope of this disclosure is not limited to any one operating system. In addition, server computer system 140 utilizes well known virtual addressing mechanisms that allow the programs of server computer system 140 to behave as if they only have access to a large, single storage entity instead of access to multiple, smaller storage entities such as main memory 160, storage 144 and DASD device 190. Therefore, while data, the operating system, and content management system 170 may reside in main memory 160, those skilled in the art will recognize that these items are not necessarily all completely contained in main memory 160 at the same time. It should also be noted that the term "memory" is used herein generically to refer to the entire virtual memory of server computer system 140, and may include the virtual memory of other computer systems coupled to computer system 140.

CPU 142 may be constructed from one or more microprocessors and/or integrated circuits. CPU 142 executes program instructions stored in main memory 160. Main memory 160 stores programs and data that CPU 142 may access. When computer system 140 starts up, CPU 142 initially executes the program instructions that make up the operating system.

Although server computer system 140 is shown to contain only a single CPU, those skilled in the art will appreciate that a content management system 170 may be practiced using a computer system that has multiple CPUs. In addition, the interfaces that are included in server computer system 140 (e.g., display interface, network interface, and DASD interface) preferably each include separate, fully programmed microprocessors that are used to off-load compute-intensive processing from CPU 142. However, those skilled in the art will appreciate that these functions may be performed using I/O adapters as well.

At this point, it is important to note that while the description above is in the context of a fully functional computer system, those skilled in the art will appreciate that the content management system 170 may be distributed as an article of manufacture in a variety of forms, and the claims extend to all suitable types of computer-readable media used to actually carry out the distribution, including recordable media such as floppy disks and CD-RW (e.g., 195 of FIG. 1).

The CMS herein may also be delivered as part of a service engagement with a client corporation, nonprofit organization, government entity, internal organizational structure, or the like. This may include configuring a computer system to perform some or all of the methods described herein, and deploying software, hardware, and web services that implement some or all of the methods described herein. This may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems.

Figure 2:
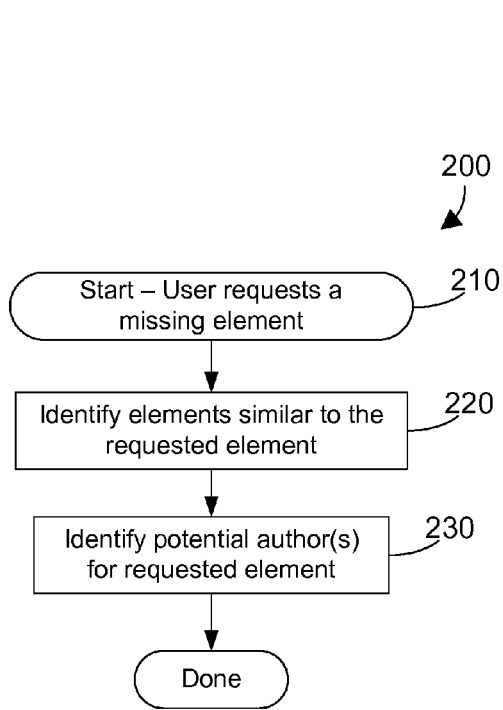
FIG. 2 is a flow diagram of a method for identifying one or more authors for a missing element.

Referring to FIG. 2, a method 200 for identifying one or more authors for a missing element begins when a user requests a missing element (step 210). Elements similar to the requested element are then identified (step 220). One or more potential authors for the requested element is then identified (step 230), and method 200 is done.

Figure 3:
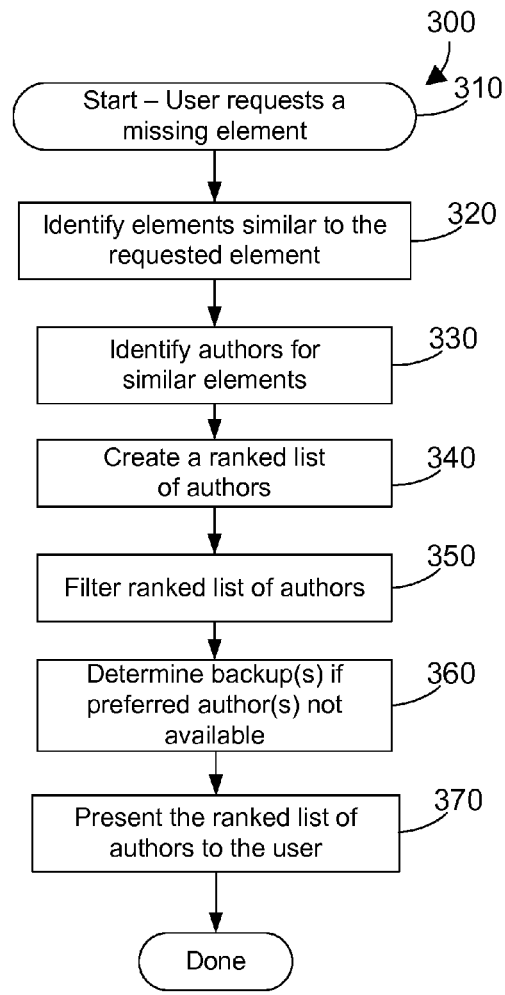
FIG. 3 is a flow diagram of a more detailed method for identifying one or more authors for a missing element to a user.

Referring to FIG. 3, a method 300 is a more detailed implementation of method 200 shown in FIG. 2. Method 300 begins when a user requests a missing element (step 310). Elements most similar to the requested element are then identified (step 320). The authors for the similar elements in step 320 are identified (step 330). A ranked list of authors is then created from the authors identified in step 330 (step 340). The ranked list of authors may then be filtered (step 350). Any suitable filter may be used. For example, a filter may be used that eliminates authors that are no longer employed at the company or that are too busy. Next, if an author on the ranked list is not available, an appropriate backup person may be selected (step 360). The ranked list of authors is then presented to the user (step 370).

Figure 4:
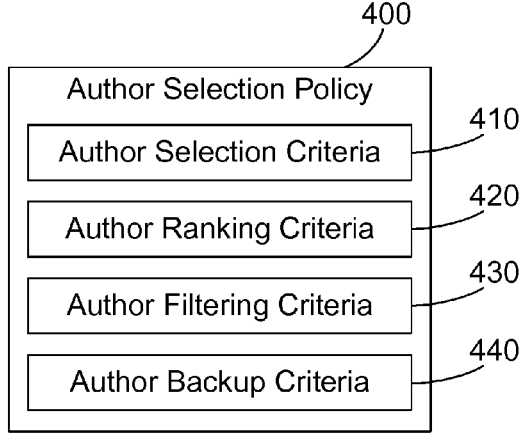
FIG. 4 is a block diagram of a sample author selection policy.

Note that steps 330, 340, 350 and 360 in FIG. 3 may all be performed according to criteria specified in the author selection policy 176 shown in FIG. 1. One suitable implementation of author selection policy 176 within the scope of the disclosure and claims herein is shown as author selection policy 400 in FIG. 4. Author selection policy 400 may include author selection criteria 410, author ranking criteria 420, author filtering criteria 430, and author backup criteria 440. Author selection criteria 410 may specify to only include an author who has authored more than one document in the list of similar documents. Author ranking criteria 420 may rank the authors according to the number of documents in the list of similar documents, the author's years of experience, rating by management, etc. Author filtering criteria 430 may exclude some authors because they are too busy. For example, author filtering criteria 430 could specify thresholds for the number of pending documents for an author and the current time the pending documents will take to complete so that authors that are too busy may be filtered from the ranked list of authors. The author backup criteria 440 may include any suitable criteria or heuristic for specifying a backup if an author is not available. For example, a simple author backup criteria 440 may specify the name of a backup author to select if the desired author is not available. A more complex author backup criteria 440 may include a heuristic that determines workload of multiple backup authors to select one of the backup authors if the desired author is not available. Note the criteria shown in FIG. 4 are given by way of example, and the disclosure and claims herein expressly extend to any suitable criteria for determining which authors of the documents in the list of similar documents are presented to the user who is assembling a document with missing content.

Figure 5:
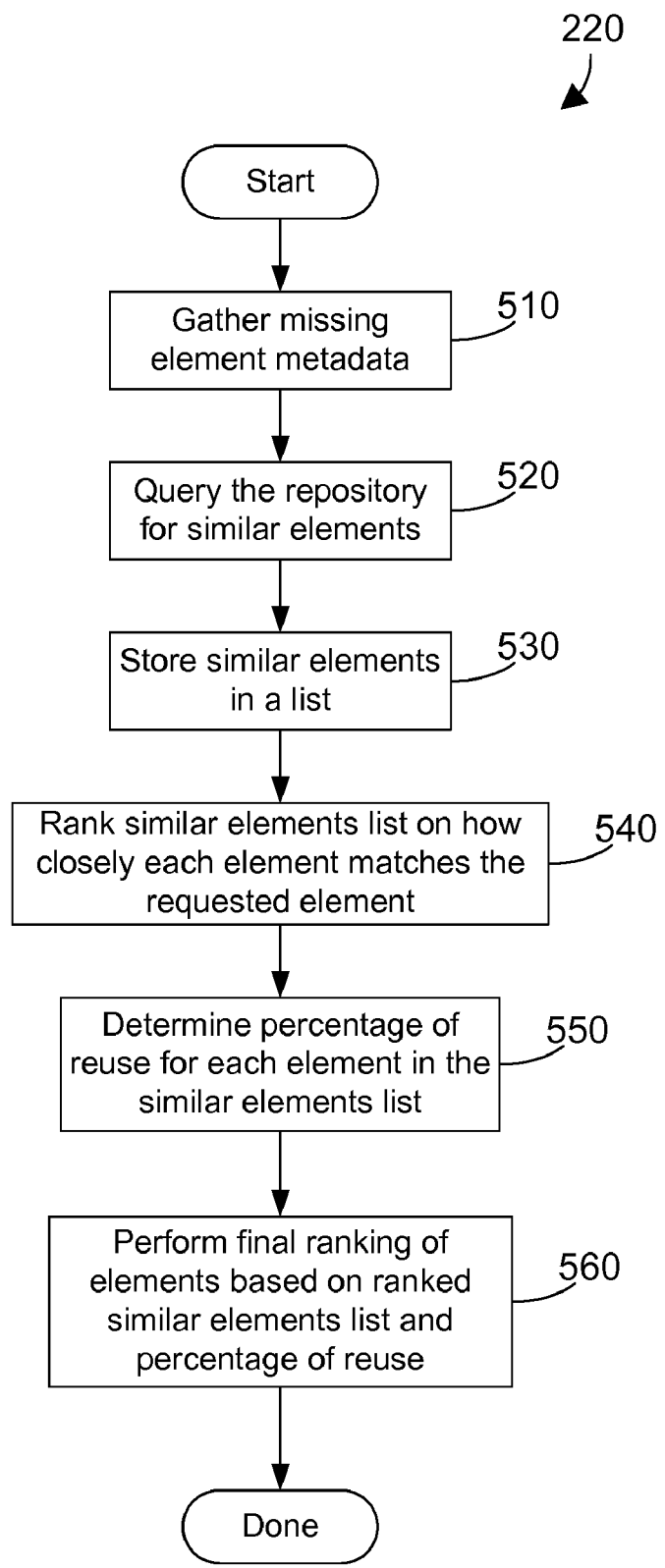
FIG. 5 is a flow diagram of one suitable implementation for step 220 in FIG. 2.

One suitable implementation of step 220 shown in FIG. 2 for identifying elements most similar to the requested element is shown as method 220 shown in FIG. 5. The missing element's metadata is gathered (step 510). This assumes a missing element has some or all of its metadata defined, but is missing some or all of the needed content. The repository is then queried for elements similar to the missing element (step 520). Note that the query parameters in step 520 are preferably derived from the metadata gathered in step 510. The elements returned from the query in step 520 are stored in a list of similar elements (step 530). The elements in the list from step 530 are then ranked depending on how closely each element matches the requested element (step 540). The percentage of reuse in other documents for each element in the ranked list is determined (step 550). A final ranking may then be performed on the elements based on the ranked list from step 540 and the percentage of reuse from step 550 (step 560).

Method 220 shown in FIG. 5 is only one suitable implementation of step 220 shown in FIG. 2. Other implementations are possible, and the claims and disclosure herein extend to any method or heuristic for identifying elements similar to a missing element.

Figures 6, 7, 8:
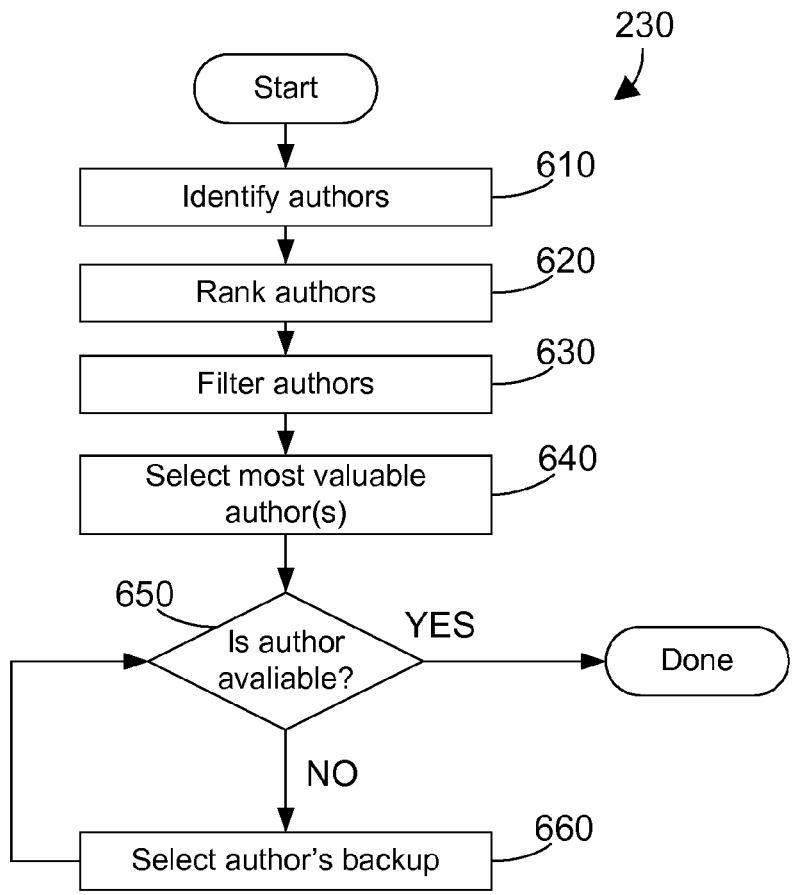
FIG. 6 is a flow diagram of one suitable implementation for step 230 in FIG. 2.

One suitable implementation of step 230 shown in FIG. 2 for identifying one or more potential authors for the missing element is shown as method 230 in FIG. 6. The authors are identified (step 610), then ranked (step 620). The ranked list of authors may be filtered (step 630). One or more authors that are deemed the most valuable are then selected (step 640). If an author selected in step 640 is not available (step 650=NO), the author's backup is selected (step 660), and the author's backup then replaces the author in the list of most valuable authors generated in step 640. If the author selected in step 640 is available (step 650=YES), the author remains on the selected list of most valuable authors, and method 230 is done. Note the steps in identifying authors 610, ranking authors 620, and filtering authors 630 in FIG. 6 preferably use corresponding author selection criteria 410, author ranking criteria 420, and author filtering criteria 430 shown in FIG. 4. In addition, the selection of the author's backup in step 660 is preferably performed according to the author backup criteria 440 shown in FIG. 4. When an author's backup is selected in step 660, an indication is preferably provided to the user so the user is aware the selected author is a backup and not the desired author, which may allow the user to consider whether to use the backup or whether to choose a different author.

Notice there are many methods that could be implemented to select one or more potential authors in step 230 shown in FIG. 2. The specific implementation in FIG. 6 is shown by way of example. Other implementations are possible, and the claims and disclosure herein extend to any heuristic or method for selecting the most valuable authors.

A simple example is now provided to illustrate many of the concepts described above. FIGS. 7-14 show sample XML documents in a repository. FIG. 7 shows a document 700 that has an object_id of 0 and has no author information. FIG. 8 shows a document 800 that has an object_id of 1 and has no author information. FIG. 9 shows a document 900 that has an object_id of 2 and no author information. FIG. 10 shows a document 1000 that has an object_id of 3 and no author information. FIG. 11 shows a document 1100 that has an object_id of 4 and an author named Joe. FIG. 12 shows a document 1200 that has an object_id of 5 and an author named Nancy. FIG. 13 shows a document 1300 that has an object_id of 6 and an author named Suzy. FIG. 14 shows a document 1400 that has an object_id of 7 and an author named Joe. We assume for this simple example that documents 700-1400 in FIGS. 7-14, respectively, are the documents present in the repository of the content management system.

FIG. 15 is a sample Windows XP user-guide XML template 1500 containing elements 1510 and 1520 that are missing information. A user functioning as a document assembler specifies the XML template 1500 and tries to populate the missing elements with elements in the repository. The XML template 1500 has two missing elements 1510 and 1520.

When the assembler searches the repository, which we assume contains elements 700-1400 shown in FIGS. 7-14, respectively, no matches are found for the required elements (i.e. the user requests a missing element; step 210 in FIG. 2; step 310 in FIG.3). One suitable way to implement steps 210 in FIG. 2 and 310 in FIG. 3 would be to have a user request an element in a template that has missing information, as illustrated in the example herein. Another implementation would be to have the user explicitly request an element that does not exist in the repository.

Because there were no elements in the repository that exactly match the requested element, a query is created from metadata gathered from the requested element (step 510 in FIG. 5). One possible query that could be created for element 1510 in FIG. 15 is shown as query 1600 in FIG. 16. The query is then executed (step 520) to locate similar elements in the repository, which are stored in a list (step 530). The results of the query are ranked according to relevance (step 540). Next, the percentage of reuse is checked for each element in the similar elements list (step 550 in FIG. 5). One suitable implementation for step 550 in FIG. 5 is to run containment reports against the elements in the ranked similar elements list to determine if any of the similar elements are referenced by documents in the repository that are similar to the document being assembled in FIG. 15. If an element from the similar elements list is referenced by a document similar to the document being assembled (FIG. 15), its ranking increases. The elements are then ranked according to the percentage of reuse (step 560 in FIG. 5). A sample ranked similar elements list is showed as list 1700 in FIG. 17. Note that element 1300 in FIG. 13 (object_id=6) is referenced by the xInclude statement 910 in document 900 in FIG. 9, and element 1200 in FIG. 12 (object_id=5) is referenced by the xInclude statement 1010 in document 1000 in FIG. 10. We assume for this example that being referenced by another document that is similar to the document being assembled in FIG. 15 increases the ranking of the referenced elements because the document is being used in a similar context. The ranking of the documents is shown in list 1700 in FIG. 17. Note the object IDs are referenced in list 1700, which are shown in the first line of each object. Because object 6 (1300 in FIG. 13) is referenced by object 2 (900 in FIG. 9), and object 2 is the same type "userguide" as the document 1500 in FIG. 15 being assembled, object 6 has the highest rank.

The claims and disclosure herein include any ranking method or heuristic. The discussion herein includes one suitable ranking method, but the claims and disclosure herein expressly extend to any method or heuristic for ranking elements.

After the similar element list has been ranked, the potential authors for the requested element are identified (step 230 in FIG. 2). The potential authors can be determined in a variety of ways, and the claims and disclosure herein include any method or heuristic for determining one or more potential authors. One suitable implementation returns the author of the highest ranked element as the most valuable author, the author of the second highest ranked element as the second most valuable author, etc. Another suitable implementation would be to take the authors of each of the elements in the ranked similar elements list and the author who appears the greatest number of times would be the most valuable author. Yet another suitable implementation would be to determine a weight for the value of each author, and then the author with the highest score would be the highest rank. The example discussed herein does not explicitly denote which implementation is used to determine the most valuable authors, but after the most valuable authors are determined, a ranked list of authors 178 is created (step 340 in FIG. 3). The ranked list of authors for the example herein is shown as list 1800 in FIG. 18. In the example herein, only the authors for the two highest ranked elements are included in the ranked list of authors 1800 shown in FIG. 18. Another suitable implementation would be to include all of the authors for each element in the similar element list.

In this simple example, the authors for the two highest ranked elements are chosen as the top candidates and are the two entries in the ranked list of authors 1800. At this time both Suzy and Nancy appear to be equally qualified for authoring the requested element. FIG. 20 includes XML-type code 2000 that specifies conditions for filtering the ranked list of authors 1800 in FIG. 18. Filtering conditions 2000 are preferably part of the author selection policy 176 in FIG. 1, and corresponds to author filtering criteria 430 in FIG. 4. Filtering conditions 2000 filter (i.e., exclude) authors in the ranked list of authors 1800 that do not meet the specified conditions. Filtering conditions 2000 specify thresholds that relate to author pending job data 1900 shown in FIG. 19. In the present example, author selection policy 1900 will filter authors in the ranked list of authors 1800 if the authors have four or more documents in progress or more than twenty days workload time. Author pending job data 1900 shows the current workloads for Joe, Nancy, and Suzy. Nancy and Suzy are the only authors that appear in the ranked list of authors 1800, and therefore are the only authors of interest. Notice that Nancy meets both thresholds (three or less documents in progress and less than twenty day workload), but Suzy does not (four in progress documents). Therefore, Suzy is filtered from the ranked list of authors 1800, to yield a ranked list with Nancy being the only author, as shown in the ranked list 1800 in FIG. 21.

The content management system disclosed herein allows a user who is assembling a document to use functionality of the content management system to commission the creation of needed content by one or more authors. Metadata is specified that describes the needed content. A query is made using the metadata to identify similar elements in the repository. The similar elements are listed. The authors of the similar elements are determined, and the list of authors may be operated on by any suitable criteria specified in an author selection policy to generate a ranked list of authors, which may be returned to the user. The user may then select an author in the list, and generate a request to the author to create the needed content.

One skilled in the art will appreciate that many variations are possible within the scope of the claims. Thus, while the disclosure is particularly shown and described above, it will be understood by those skilled in the art that these and other changes in form and details may be made therein without departing from the spirit and scope of the claims. For example, while the examples in the figures and discussed above related to XML documents, the disclosure and claims herein expressly extend to content management systems that handle any suitable type of content, whether currently known or developed in the future. In addition, while the specific examples herein end with presenting a list of one or more authors to a user so the user may select an author on the list for creating the missing content, a natural extension of the examples herein could automatically request the needed content from multiple authors in the ranked list of authors, then assign the work to the first author to reply. Of course, other suitable criteria or heuristics could be employed to assign the work of creating the missing content to one or more authors.

What is claimed is:

1. An apparatus comprising:
   at least one processor;
   a memory coupled to the at least on processor;
   a repository residing in the memory; and
   a content management system residing in the memory and executed by the at least one processor, the content management system comprising a missing content author selection mechanism that receives a first request for an element, determines the requested element is not in the repository, and in response to determining the requested element is not respository, creates and processes a second request for similar elements in the repository, wherein the second request comprises a query to the repository created from metadata for the element requested in the first request, determines at least one element in the repository that satisfies the second request, builds a list of the at least one element in the respository that satisfies the second request, identifies at least one author for the at least one element in the repository in the list, creates a ranked list of authors based on authors for the at least one element in the list, and determines at least one backup author if any preferred author in the ranked list of authors is not available.

2. The apparatus of claim 1 wherein the first request made by a user selecting an element with missing data in a template.

3. The apparatus of claim 1 wherein the ranked list of authors is presented to a user.

4. The apparatus of claim 1 wherein the ranked list of authors is created according to an author selection policy that specifies at least one criterion for selecting an author.

5. A computer-implemented method for determining an author to create a missing element in a content management system, the method comprising the steps of:
   (A) a user requests a first element that is not in a repository controlled by the content management system;
   (B) in response to determining the requested element is not in the repository in step (A), creating from metadata for the first element a second request comprising a query to the repository for similar elements in the repository;
   (C) processing a second request for similar elements in the repository;
   (D) determining at least one element in the repository that satisfies the second request;
   (E) building a list of the at least one element that satisfies the second request;
   (F) identifying at least one author for the at least one element in the repository that satisfies the second request;
   (G) creating a ranked list of authors based on authors for the at least one element in the list; and
   (H) determining at least one backup author if any preferred author in the ranked list of authors is not available.

6. The method of claim 5 wherein step (A) comprises the step of the user selecting an element with missing data in a template.

7. The method of claim 5 further comprising the step of presenting the ranked list of authors to the user.

8. The method of claim 5 further comprising the step of creating the ranked list of authors according to an author selection policy that specifies at least one criterion for selecting an author.

9. A computer-implemented method for determining an author to create an element in a content management system, the method comprising the steps of:
   (A) a user selecting an element with missing data in a template;
   (B) in response to step (A), generating a query to a repository from metadata of the selected element;
   (C) executing the query to determine at least one element in the repository that is similar to the selected element;
   (D) populating a similar element list with results from executing the query in step (C);
   (E) ranking the similar element list based on how well each similar element matches the selected element;
   (F) identifying authors for the elements in the similar element list;
   (G) creating a ranked list of the authors identified in (F) according to an author selection policy that specifies if an author has more than a first predefined number of documents in progress, removing the author from the ranked list of the authors, that specifies if an author has a workload time of more than a second predefined number of days, removing the author from the ranked list of the authors; and that specifies at least one backup author in case the author is no available;
   (H) determining from the author selection policy at least one backup author if any preferred author in the ranked list of authors is not available; and
   (I) presenting the ranked list of authors to the user.

10. An article of manufacture comprising:
    (A) a content management system comprising:
       a missing content author selection mechanism that, when a first request is made for an element not in a repository, and in response to determining the requested element is not in the repository, creates and processes a second request for similar elements in the repository to determine at least one element in the respository that satisfies the second request wherein the second request comprises a query to the repository created from metadata for the element requested in the first request, builds a list of the at least one element in the respository that satisfies the second request, identifies at least one author for the at least one element in the repository in the list, creates a ranked list of authors based on authors for the at least one element in the list, and determines at least one backup author if any preferred author in the ranked list of authors is not available; and
    (B) computer-readable media bearing the content management system.

11. The article of manufacture of claim 10 wherein the first request is made by a user selecting an element with missing data in a template.

12. The article of manufacture of claim 10 wherein the ranked list of authors is presented to a user.

13. The article of manufacture of claim 10 wherein the ranked list of authors is created according to an author selection policy that specifies at least one criterion for selecting an author.

* * * * *